United States Patent [19]

Housas et al.

[11] Patent Number: 4,487,421
[45] Date of Patent: Dec. 11, 1984

[54] PIPE GASKET WITH REINFORCING MEANS IN ITS BASE SELF-ENERGIZING

[75] Inventors: Jim Housas, Stow; Anthony J. Reto, Kent, both of Ohio

[73] Assignee: Hamilton Kent Manufacturing Company, Inc., Kent, Ohio

[21] Appl. No.: 493,321

[22] Filed: May 10, 1983

[51] Int. Cl.³ .............................................. F16J 15/32
[52] U.S. Cl. .................................. 277/207 A; 277/166; 277/205; 277/207 R; 285/110; 285/379
[58] Field of Search ............... 277/166, 205, 207 R, 277/207 A, 207 B, DIG. 2; 285/110, 111, 379

[56] References Cited

U.S. PATENT DOCUMENTS

| 3,386,745 | 6/1968 | Hein | 277/207 A |
| 4,061,346 | 12/1977 | Coleman et al. | 277/205 |
| 4,223,895 | 9/1980 | Roberts et al. | 277/DIG. 2 X |
| 4,299,412 | 11/1981 | Parmann | 285/110 |

FOREIGN PATENT DOCUMENTS

| 2313625 | 12/1976 | France | 277/207 A |
| 6516470 | 7/1966 | Netherlands | 285/111 |
| 7802712 | 10/1979 | Sweden | 285/379 |
| 7803870 | 10/1979 | Sweden | 277/DIG. 2 |
| 2069630 | 8/1981 | United Kingdom | 277/DIG. 2 |

Primary Examiner—Robert S. Ward
Attorney, Agent, or Firm—Maky, Renner, Otto & Boisselle

[57] ABSTRACT

A self energizing pipe gasket includes a base and arm configuration projecting therefrom which cooperates with the base when pipe sections are assembled to cause the lip or sealing edge of the arm to kick away or distend toward the sealing surface of the pipe. To facilitate this action a harder insert is provided in the base in the form of a reinforcing ring providing a less compressible surface for the arm to react against. The ring also stiffens the gasket making it more difficult to dislodge upon assembly of the pipe sections enabling higher compression forces and assuring that the gasket does not go under or below the minimal compression requirements to form a sound flexible yet fluid tight seal.

28 Claims, 15 Drawing Figures

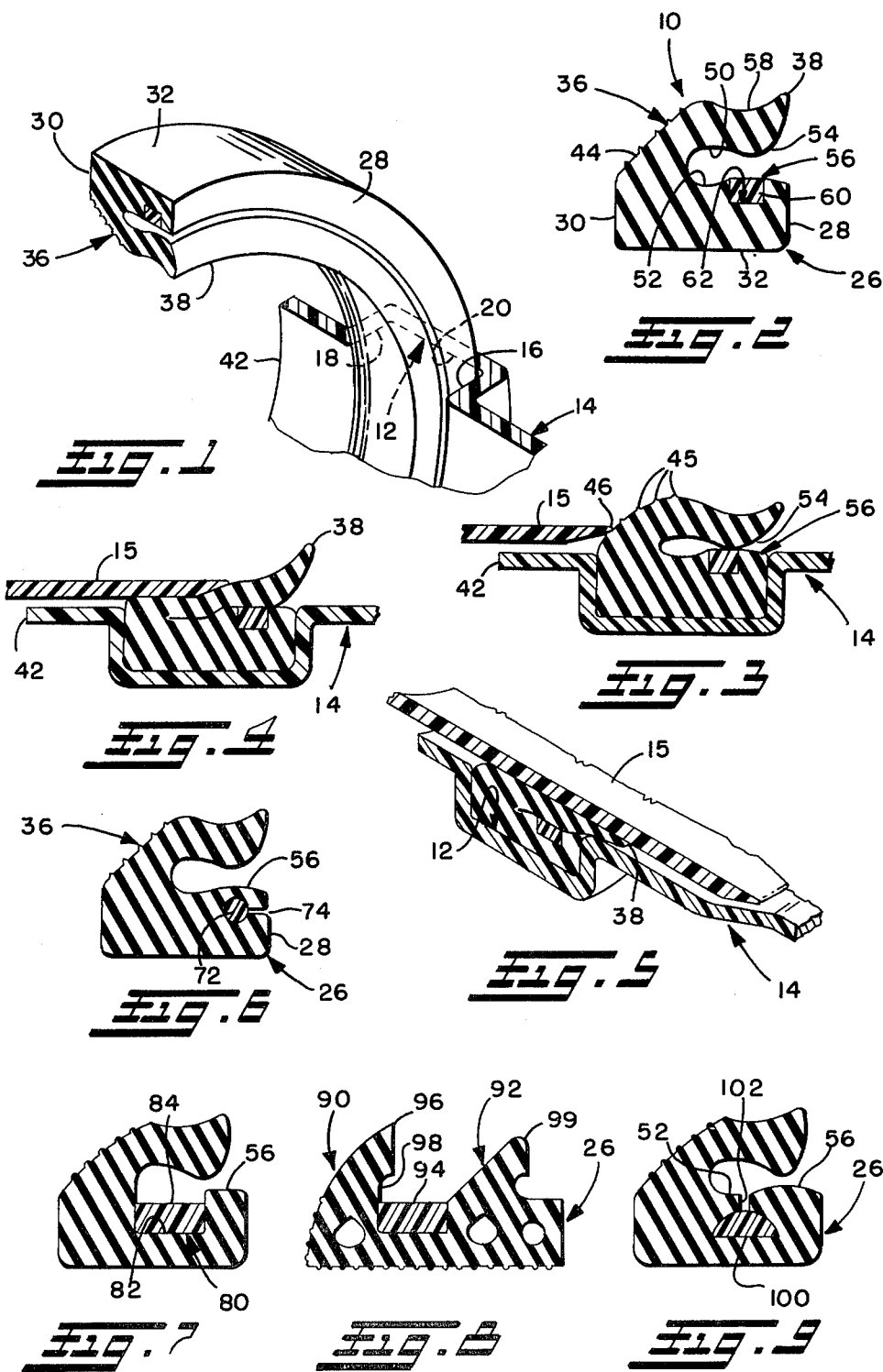

PIPE GASKET WITH REINFORCING MEANS IN ITS BASE SELF-ENERGIZING

BACKGROUND OF THE INVENTION

The present invention relates to pipe gaskets for sealing a bell and spigot pipe connection. Specifically the present invention relates to a gasket having a base and a sealing lip which is pressed against the base to form a tight seal by mechanical interaction between the base and the arm.

Pipes used for water supply lines or sewage lines frequently have a bell at one end which receives the spigot of an adjacent section of pipe. Typically, in plastic pipe the bell includes an internal, annular recess in which a gasket is placed to seal the joint between the bell and spigot. The gasket must not only make an effective seal, it must also be relatively simple to install and must retain itself in the recess in the bell, and it must allow the spigot to be inserted relatively easily.

One design that has proven successful in meeting these goals is shown in U.S. Pat. No. 3,173,694 to Nathan, which is incorporated herein by reference. Broadly, this patent shows a pipe gasket comprising a relatively compressible elastomeric base of annular shape. A flexible, conical arm is attached to the leading periphery of the base and tapers inwardly to a sealing lip over the trailing periphery of the base. The arm and base are formed so that as the spigot is inserted into the bell the arm folds over on the base. The base or the arm has a raised, fulcrum portion which contacts the opposite element at approximately its midportion as the arm is folded over. As compression continues the interaction of the arm and the base cause the lip of the arm to kick away from the base and to cause the lip to seal more tightly against the spigot than it would otherwise. The same reaction occurs in the base causing it to seat more firmly in the bell even though it may not be provided with a corresponding lip. Such gaskets have been sold for years by Hamilton Kent Manufacturing Company of Kent, Ohio, and are known as "self energizing" gaskets.

SUMMARY OF THE INVENTION

The present invention provides a seal of the self energizing type improved by including a harder reinforcing ring in the base to limit compressibility of the base in the region where the arm is pressed against the base. A gasket constructed in accordance with the present invention seals more tightly than prior art gaskets enhancing the self energizing action. It also better retains its position in the recess of a bell enabling more force to be exerted on the gasket and provides improved compression ratios assuring that the gasket does not go under or below minimal compression requirements to form a flexible fluid tight seal.

According to the present invention a gasket for pipe joints includes an annular base portion which may be shaped to fit a recess in a pipe bell or against the shoulder of a spigot. An arm extends from the base around its entire perimeter and is inclined away from the open end of the bell or spigot. The arm terminates in a sealing lip which seals against the outside of the spigot, or the inside of the bell if inserted on a spigot. As the spigot is inserted, the arm is bent over, rocking on a raised fulcrum part of the base or arm, and the sealing lip of the arm is thereby kicked toward or pressed against the spigot or bell. The action at the fulcrum is enhanced by the present invention's reinforcing ring which is disposed in a recess in the base to reduce the compressibility of the base in the region of the fulcrum. The ring is made of a plastic or metal material which is relatively hard also having greater tensile strength. The ring resists compression in the area of the fulcrum and increases the sealing force applied to the lip. Also, once installed, the gasket constructed in accordance with the present invention is relatively more stiff and difficult to displace from the recess in the bell. The selected size, configuration and location of the ring also improve the compressibility of the gasket enabling more rubber to be tightly compressed in the area of the seal and assuring that the gasket is above the minimal compression requirements to form a fluid tight seal.

The invention, then, comprises the features hereinafter fully described and particularly pointed out in the claims, the following description and annexed drawings setting forth in detail certain illustrative embodiments of the invention, these being indicative, however, of but a few of the various ways in which the principles of the invention may be embodied.

BRIEF DESCRIPTION OF THE DRAWINGS

In the annexed drawings:

FIG. 1 is a partly cut away isometric view of a preferred gasket constructed in accordance with the present invention and installed in a recess in the bell of a pipe;

FIG. 2 is a cross section of the gasket of FIG. 1 prior to installation;

FIG. 3 shows the gasket of FIG. 2 installed in a recess in the bell of a pipe during an initial stage of insertion of a spigot into the bell;

FIG. 4 is generally similar to FIG. 3 but showing a subsequent stage of insertion of the spigot into the bell;

FIG. 5 is a cut-away isometric illustration of the gasket of FIG. 4 installed in a recess in the bell of a pipe with a spigot fully inserted;

FIGS. 6–12 are sectional views of other embodiments of the gasket of the present invention;

DESCRIPTION OF PREFERRED EMBODIMENTS

Figure 10:
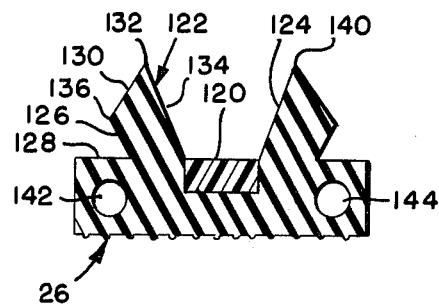

FIG. 1 illustrates a gasket 10 constructed in accordance with the present invention and installed in a recess 12 in the bell 14 of a pipe. The recess 12 has a minor diameter the same as the inside diameter of the bell 14 of the pipe while its major diameter is larger than the inside diameter of the bell. The inside diameter of the bell 14 is slightly larger than the outside diameter of the spigot 15 (FIGS. 2–5) of a pipe to be telescopically received within the bell 14, as is conventional. The recess 12 (FIG. 1) includes a pair of radially extending annular walls 16 and 18 connected by an annular and axially extending wall 20, giving the recess 12 overall a rectangular cross-section. However, the recess 12 could be shaped with different cross-sections, as seen, for example, in FIGS. 13 and 14.

The gasket 10 includes a base 26 (FIG. 2) which is annular and generally of the same size and configuration as the recess 12 (FIG. 1). Thus the base 26 has a pair of parallel radially extending walls 28 and 30 which are essentially of the same radial extent as the walls 16 and 18 of the recess 12. The base 26 has a radially outermost or bottom surface 32 which abuts the bottom surface 20 of the recess 12 when the gasket 10 is installed in the bell 14. Obviously, the shape of the recess 12 dictates the shape of the outside contours of the base 26.

An arm 36 is connected with the base 26 at the leading or upstream end surface 30 of the base 26. The arm 36 is generally frustoconical and terminates in a circular lip 38 which seals against the outside surface of a spigot 15 (FIG. 5) when the spigot is fully installed. Prior to installation of the spigot 15, the arm 36 tapers radially inwardly and extends in a downstream direction, i.e., away from the open end 42 of the bell and leading edge 30 and toward the trailing edge 28 of the base. The circular lip 38 has a diameter which is smaller than the outside diameter of the spigot 15 to which it seals.

The seal 10 is designed to facilitate easy installation of the spigot 15. To this end the arm 36 includes an inclined surface 44 which merges with the leading surface 30 of the base but at an angle of about 45° thereto. The surface 44 may be provided with circular ridges 45 for additional surface locking and insertion sealing effectiveness. The surface 44 is engaged by the leading tip 46 of the spigot 15 (FIG. 3) as the spigot is inserted from the open end 42 of the bell 14. The angle of the surface 44 facilitates folding over of the arm 36.

Additionally, the arm 36 and base 26 include surfaces 50 and 52, respectively, which cooperate to define a hollow into which the material of the arm may be pressed during insertion of the spigot. Both the surfaces 50 and 52 are concave, slightly relieving the arm 36 and base 26, respectively. This makes it easier to fold the arm 36 over as the spigot 40 is inserted. Moreover, relieving the area 50 leaves a slight bluge 54 on the radially outer portion of the arm 36. Relieving the area 52 leaves a bulge or raised fulcrum portion 56 on the radially inner surface of the base 26.

The arm 36 is shaped to cooperate with the raised fulcrum 56 of the base, itself including a projecting fulcrum 54, to make a tight seal with the spigot 15. Complementary to the bulge 54 is an arcuate recess 58 formed in the radially inner surface of the arm 36. The circular lip 38 thus is defined by the intersection of concave curve 58 and convex curve 54 which form the recess 58 and bulge 54, respectively. As the spigot 15 is inserted, the arm 36 is first folded over until the bulge 54 contacts the raised fulcrum 56 (FIG. 3). Further inward movement of the spigot 15 (FIG. 4) squeezes and compresses the material of the arm causing the circular lip 38 to curl or kick radially inwardly (upwardly in FIGS. 2-4) as the material in the bulge 54 is squeezed. By the time the spigot 15 is fully installed, the lip 38 is pressed very tightly against the exterior surface of the spigot.

The gasket 10 includes a reinforcing ring 60 which is disposed in a recess 62 in the raised fulcrum 56 of the base 26. The recess 62 has a generally rectangular cross-section with sides and bottom parallel to the sides and bottom of the base 26. The depth of the recess 62 is selected so that the reinforcing ring 60 sits substantially flush with the top of the raised fulcrum 56.

The reinforcing ring 60 is made of a harder material than the body of the gasket such as a plastic material which is relatively unstretchable, although it is somewhat flexible in bending, although less so than the rubber of the gasket. As a result the reinforcing ring 60 greatly limits the compressibility of the raised fulcrum portion 56 of the base 26. Thus as the spigot 15 is inserted, the compressive force on the arm 36 caused by squeezing of the bulge 54 is firmly resisted by the tensile strength and hardness of the reinforcing ring 60. Almost all the deformation takes place in the arm 36, with very little yielding of the base 26 or reinforcing ring 60.

The gasket 10 not only seals more tightly than prior art gaskets because of the reinforcing ring 60, but it also is easier to keep in place in a recess 12 (FIG. 1) in the bell 14 of a pipe, both before and during insertion of the spigot. The reinforcing ring 60 has a major diameter which is larger than the minor diameter of the recess 12. Since the reinforcing ring 60 is somewhat flexible in bending, it is easy to distort the gasket 10 to install it. However, once installed, the gasket is difficult to displace from its recess by forces applied axially of the pipe as by installing a spigot 15.

Also, because the material of the ring is harder than that of the gasket and will not flow under compression, the ring permits higher compression forces to be utilized assuring the achievement of desired high pressure requirements to obtain a fluid tight seal.

The gasket 10 has been shown and described installed in a recess formed in the interior of a bell into which a spigot is inserted. It is also contemplated that the gasket 10 could be installed with its base 26 received in a recess or shoulder in the exterior of a spigot.

FIGS. 6-12 illustrate further embodiments of the present invention which have differently shaped arms and differently shaped and located reinforcing rings but which operate on the same principles as discussed above. In these figures the same reference numerals are used to identify similar parts. Specifically, FIG. 6 illustrates a gasket having a circular reinforcing ring 70 which is inserted into a circular recess 72 located below the surface of the raised fulcrum portion 56 of the base 26. A slot 74 connecting the recess 72 with the face 28 of the base 26 allows the ring 70 to be inserted.

In FIG. 7 the reinforcing ring 80 is rectangular in cross-section but its axial extent is so large that the recess 82 in which the reinforcing ring 80 is received consumes the relieved area 52 of the embodiment shown in FIG. 2. Moreover, the radially innermost surface 84 of the reinforcing ring 80 does not reach as far as the raised fulcrum 56. In this manner, as the fulcrum 52 is compressed, it tends to flow over the top of the ring 80 (to the left in FIG. 7) securely locking the ring in place.

FIG. 8 illustrates a further embodiment of the present invention in which the gasket includes two arms 90 and 92 in a tandem arrangement. The arm 90 is undercut as shown at 98 to facilitate flexing of the arm. The reinforcing ring 94 sits between the two arms and serves to increase the sealing power of the lip 96 of the somewhat larger leading arm 90. The lip 99 of arm 92 cooperates with the base 26 in much the same manner as in the previously mentioned patent to Nathan. Thus in the embodiment of FIG. 8 the lefthand portion including arm 90 and reinforcing ring 94 cooperate in accordance with the present invention and are connected in tandem with an arm 92 of the Nathan type.

FIG. 8 illustrates yet another embodiment of the present invention in which a reinforcing ring 100 has a semicircular cross-section and is embedded in a recess in the base 26 of similar cross-section. The reinforcing ring 100 is mounted below the raised fulcrum surface 56 of the base 26 and slightly toward the upstream or end 30 thereof. The reinforcing ring 100 is inserted into the base 26 through a gap 102 formed in the recess or relieved area 52 of the radially inner surface of the base 26.

FIG. 10 illustrates a symmetrical embodiment of the present invention which is easy to install because the upstream and downstream ends are identical, thus avoiding the possibility of inserting the gasket incorrectly. In FIG. 10 the gasket is provided with a single reinforcing ring 120 disposed at the axial midline of the gasket. Extending upward therefrom and on either side thereof are a pair of symmetrical arms 122 and 124. The arm 122 includes a leading surface 126 which is inclined at an actue angle to the upper surface 128 of the base 26. The leading surface 126 is connected with a beveled surface 130 which is inclined in the opposite direction to the top surface 128 of the base from the inclination of surface 126. The surface 130 terminates at its radially innermost perimeter at an apex 132 formed by the acute intersection of surface 130 with trailing surface 134.

If the spigot or bell is inserted from the left as viewed in FIG. 10, the arms 122 and 124 are bent to the right with the annular intersection 136 of surfaces 126 and 130 forming the sealing lip which bears against the exterior of the spigot. This sealing lip 136 is forced radially outward by the reinforcing ring 120. At the same time the apex 140 of the arm 124 is pressed against the bell or spigot. The base 26 (FIG. 10) is provided with a pair of symmetrical hollows or holes 142 and 144 which facilitate the flexing and bending of the arms 122 and 124, by permitting the area of the base in which the holes are situated to compress to a greater degree. Obviously, because of the symmetry of the gasket illustrated in FIG. 10, if the spigot is inserted from the right then the operation and cooperation of the arms 122 and 124 is reversed.

Figure 11:
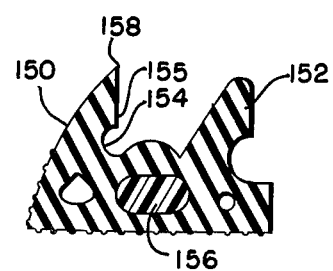

FIG. 11 illustrates yet another embodiment of the present invention provided with two arms 150 and 152. The gasket of FIG. 11 is not reversible, and the somewhat larger leading arm 150 is provided with an undercut or relief at 154 which facilitates its bending over, and also creates a projecting fulcrum point at 155. In addition the reinforcing ring 156 is provided to the downstream side of the recess 154 and radially offset thereof. Upon installation of the gasket illustrated in FIG. 11 the tip 158 of the arm 154 is pressed into sealing engagement with the spigot or bell as the arm is trapped between the ring 156 and the spigot.

It is noted that each of the embodiments of FIGS. 8, 10 and 11 illustrates relief holes which facilitate compression of the base in the area of the holes making the bell or spigot easier to insert in or over the other. With the present invention it has been found that these relief holes may be omitted, or, as in the case of FIG. 11, the reinforcing ring 156 may be inserted in what would otherwise be a relief hole. The presence of the ring permits higher compression forces to be exerted on the gasket without dislodgement and also obtaining a better seal. Also, it should be appreciated that the gaskets of FIGS. 8, 10 and 11 may be inserted on a spigot against a shoulder with the bell of the adjacent section then telescoped thereover. The arms then extend radially outwardly instead of inwardly.

Figure 12:
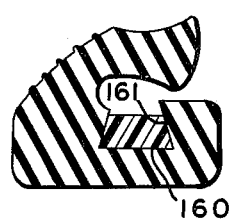

FIG. 12 illustrates an embodiment generally similar to that shown in FIG. 7 in which the reinforcing ring 160 has a trapezoidal cross-section and is received in a groove 161 in the base of similar configuration. This precludes the ring from being displaced and the action of compression of the rubber at the fulcrum also causes the rubber of the base to flow over the top of the ring.

Figure 13:
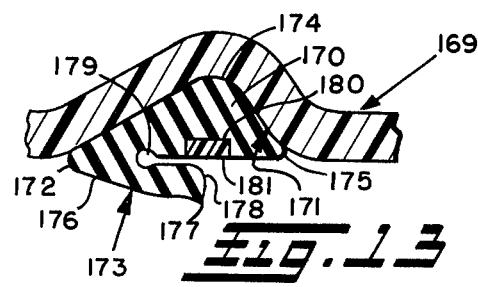
FIG. 13 is a fragmentary section of another form of gasket inserted in a corresponding groove of a bell.
Figure 14:
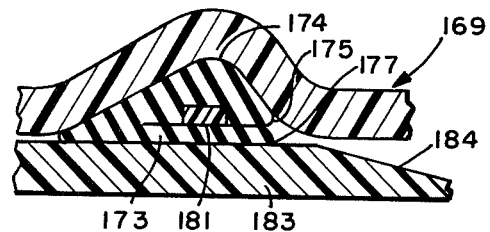
FIG. 14 is a view similar to FIG. 13 showing the spigot inserted.

In FIGS. 13 and 14 there is illustrated a gasket which is self-energizing but which has a different configuration base and accordingly a different configuration groove in the bell 169. Also, it ought to be cautioned that the section of FIGS. 13 and 14 is taken diametrically opposite, for example to the section of FIG. 4, and thus the base and the corresponding groove is on top.

The base 170 and the corresponding groove 171 in the bell are in the general form of a 30-60-90 degree triangle, with the hypotenuse forming the top of the base or the open side of the groove. The 30 degree corner extends toward the open end of the bell, and terminates in a radiused edge 172, which is also the leading edge of inwardly extending arm 173. The apex 174 is somewhat more rounded as is the apex of the groove, and the 60 degree corner also has a radiused lip 175. The arm includes a leading taper 176 which feathers to a relatively sharp sealing lip 177. The underside of the arm includes a fulcrum bulge 178 and joins the base at slightly enlarged hollow 179. The base includes a slot 180 for reinforcing ring 181 opposite the bulge.

In operation, the spigot 182 enters the bell and the tapered leading edge 184 flattens the arm against the base driving the bulge 178 against the harder ring 181 causing the lip to kick or distend inwardly forming a tight seal against the outside of the spigot. Such action also tends to force the lip 175 toward the bell forming a very effective seal.

Figure 15:
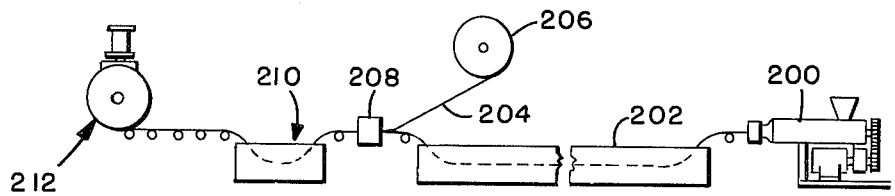
FIG. 15 is a schematic illustration of an apparatus for making gaskets in accordance with the present invention.

FIG. 15 illustrates apparatus for manufacturing gaskets in accordance with the present invention. An extruder 200 extrudes a resilient rubber material to form a continuous strip having the cross section shown, for example, in FIG. 2. This material may be rubber, neoprene, etc. After extrusion, the rubber material is fed through various baths and treatments to cure or vulcanize it as shown at 202. Thereafter a continuous strand 204 of plastic or wire in the shape of the ring is fed from a spool 206 and inserted into the recess, e.g. 62 (FIG. 2) by a threading or inserting mechanism 208. The continuous strip of gasket is then cooled by cooling baths 210 before being fed to a continuous coiling machine 212. The machine 212 receives the continuous strip of gasket material and coils it into a helical coil of predetermined and exact diameter. Thereafter, the coil is cut lengthwise severing each turn of the helix one time to form a plurality of segments each of the same length. Each segment is then joined to itself in conventional manner to form an annular gasket of the desired diameter. In the case of FIG. 11, the gasket may be co-extruded on the strand forming the ring. It will of course be appreciated that pre-cut lengths of wire or plastic strand may be hand inserted into pre-cut lengths of gasket before or after circularization and joining.

Thus it is clear that the present invention provides an improved gasket which includes a plastic or wire reinforcing ring in its base to limit compressibility of the base in the region where the arm is pressed against the base. The gasket constructed in accordance with the present invention seals more tightly than prior art gaskets and retains its position in the recess of the bell of a pipe, or against the shoulder of a spigot, more securely than prior art gaskets while ensuring that the compression of the gasket is above the minimal compression requirements to form a sound fluid tight seal.

As indicated, the gasket is formed of a softer material such as rubber, neoprene, or an elastomer, while the ring may be formed of a hard plastic, such as polypropylene, or a metal such as an alloy of copper or steel.

The following is claimed:

1. A gasket comprising a compressible base adapted to be received by one of a pair of telescoping pipes, an arm connected with and extending from said base and terminating in a sealing lip which curves away from said base and is adapted to engage the other of the pipes, said base having a surface adapted to engage said arm between said connection with said base and said lip upon telescoping of the pipes together to press said lip against the other of said pipes and reinforcing means in said base to reduce the compressibility of said base in the area of said surface.

2. The gasket of claim 1, said compressible base being formed of rubber or like material.

3. The gasket of claim 1 wherein said reinforcing means includes an annular ring of harder material than said base.

4. The gasket of claim 3 wherein said annular ring is received in a recess in said base.

5. The gasket of claim 4 wherein said annular ring has a rectangular cross-section.

6. The gasket of claim 5, said recess in said base enclosing three sides of said ring.

7. The gasket of claim 4, said ring having a circular cross-section.

8. The gasket of claim 7, said recess substantially completely enclosing said ring.

9. The gasket of claim 1 including two of said arms symmetrically disposed about a plane normal to the axes of said pipes, whereby said gasket is reversible.

10. The gasket of claim 1 including means for facilitating bending of said arm with respect to said base, including a hollow within said gasket.

11. The gasket of claim 10 wherein said hollow is defined entirely by surfaces of said base.

12. The gasket of claim 10 wherein said hollow is defined cooperatively by a surface of said base and a surface of said arm.

13. The gasket of claim 3 wherein said ring is located at the approximate midpoint of said arm when the pipes are fully telescoped.

14. The gasket of claim 3 wherein said ring is semi-circular in cross-section.

15. The gasket of claim 3 wherein said ring has a trapezoidal cross-section.

16. The gasket of claim 3 wherein said ring is circular in cross-section.

17. The gasket of claim 3 wherein said ring extends through an enclosed hole in said base.

18. The gasket of claim 1 further including a second arm extending from said base and terminating in a lip.

19. The gasket of claim 3 adapted to be received in an annular recess circumscribing a pipe, said ring having a diameter between the major and minor diameters of said recess.

20. A gasket for use in sealing a telescopic connection between two pipes, said gasket including an annular base portion having exterior surfaces adapted to be received in an annular groove or against a shoulder in one of the pipes, an annular arm arching over said base, a proximal end portion of said arm being connected with said base and a distal end portion of said arm terminating in a tapering lip directed away from said base, means for facilitating flexing of said arm with respect to said base, said means including hollow surface means defining a hollow in said gasket, said arm including an exterior surface for engaging the other one of said pipes as said pipes are telescoped, said base including harder surface means for engaging an interior surface of said arm as said arm flexes during telescoping of said pipes and for compressing said distal portion of said arm to press said lip outwardly away from said base, and annular harder ring means mounted in said base for stiffening said surface means of said base.

21. A gasket as set forth in claim 20 wherein said annular ring is plastic.

22. A gasket as set forth in claim 21 wherein said ring is polypropylene.

23. A gasket as set forth in claim 20 wherein said ring is metal.

24. A gasket as set forth in claim 20 wherein said ring is discontinuous.

25. A gasket as set forth in claim 20 wherein said ring has a rectangular section.

26. A gasket as set forth in claim 20 wherein said ring has a semi-circular section.

27. A gasket as set forth in claim 20 wherein said ring has a trapezoidal section.

28. A gasket as set forth in claim 20 wherein said ring has a rectangular section with rounded ends.

* * * * *